(12) United States Patent
Que

(10) Patent No.: US 6,449,410 B1
(45) Date of Patent: Sep. 10, 2002

(54) TWO-DIMENSIONAL TUNABLE FILTER ARRAY FOR A MATRIX OF INTEGRATED FIBER OPTIC INPUT-OUTPUT LIGHT CHANNELS

(75) Inventor: Long Que, San Jose, CA (US)

(73) Assignee: Optic Net, Inc., San Francisco, CA (US)

( * ) Notice: Subject to any disclaimer, the term of this patent is extended or adjusted under 35 U.S.C. 154(b) by 0 days.

(21) Appl. No.: 09/811,142

(22) Filed: Mar. 16, 2001

(51) Int. Cl.[7] .................................................. G02B 6/26
(52) U.S. Cl. ........................................................ 385/31
(58) Field of Search ............................. 385/37, 31, 47, 385/14, 147, 15; 359/247, 291, 575

(56) References Cited

U.S. PATENT DOCUMENTS

| | | | | |
|---|---|---|---|---|
| 5,659,640 A | * | 8/1997 | Joyner | 359/575 |
| 5,835,255 A | * | 11/1998 | Miles | 359/291 |
| 5,986,796 A | * | 11/1999 | Miles | 359/247 |
| 6,023,061 A | * | 2/2000 | Bodkin | 250/252.1 |
| 6,297,907 B1 | * | 10/2001 | Wang | 349/106 |
| 6,343,171 B1 | * | 1/2002 | Yoshimura et al. | 385/14 |

OTHER PUBLICATIONS

P. Tayebati, et al., "Microelectromechanical Tunable Filter With Stable Half Symmetric Cavity" Electronics Letters, 34, (1998), pp. 1967–1968.
M. Sekimura, "Anisotropic Etching of Surfactant–Added TMAH Solution," IEEE International Conference on Microelectromechanical Systems, (1999), pp. 650–655.
D.J. Sadler, et al., "Optical Reflectivity of Micromachined {111}–oriented Silicon Mirrors For Optical Input–Output Couplers," Journal of Micromech. Microeng. 7 (1997) pp. 263–269.

* cited by examiner

Primary Examiner—Akm E. Ullah
(74) Attorney, Agent, or Firm—Coudert Brothers LLP

(57) ABSTRACT

An integrated two-dimensional tunable filter array for a matrix of fiber-optic input-output light channels includes a tunable filter chip array sandwiched between a first semiconductive wafer in which the guiding grooves for the input light channels terminate in a 45° reflecting surface causing a 90° turn of the light beams into each tunable filter of the array. Then a third semiconductive substrate is bonded to the other side of the tunable filter array to receive the reflected light beams. A 45° mirror on a {111} plane may be formed by slow etching of a {100} type wafer or the use of a {100} type wafer with a 9.7° off axis cut.

3 Claims, 2 Drawing Sheets

TWO-DIMENSIONAL TUNABLE FILTER ARRAY FOR A MATRIX OF INTEGRATED FIBER OPTIC INPUT-OUTPUT LIGHT CHANNELS

INTRODUCTION

The present application is directed to a two-dimensional tunable filter array for a matrix of integrated fiber optic input-output light channels.

BACKGROUND OF THE INVENTION

A tunable filter is one of the key components in a multi-channel light wave system; e.g., a wavelength division multiplexing (WDM) system. Several microelectromechanical tunable filters have been developed. One is shown in an article entitled, "Microelectromechanical tunable filter with stable half symmetric cavity," Electronics Letters, 34, (1998), pp. 1967–1968, P. Tayebati, et al. The reported channel spacing for these devices is around 10 nm. Experiments have shown that the misalignment between the filters and their input-output couplers of fiber optic light channels were found to be about 0.25 $\mu$m. Thus, this is very challenging from a manufacturing standpoint to align the discrete components (namely, a tunable filter array and a fiber array) with that tolerance.

OBJECT AND SUMMARY OF INVENTION

It is therefore an object of the present invention to provide integrated two-dimensional tunable filter array for a matrix of fiber optic input-output channels.

In accordance with the above invention there is provided an integrated two-dimensional tunable filter array for a matrix of fiber optic input/output light channels incorporating microelectromechanical (MEMS) tunable filters comprising a first semiconductor substrate having a plurality of guiding grooves for such input light channels aligned in a predetermined plane parallel to the major surfaces of the substrate extending from an external portion of the substrate and terminating in an interior array in the substrate in 45° reflecting surfaces to cause light beams of inserted light channels in the guides to be reflected 90° from the plane. A second semiconductive chip is bonded to the first substrate and incorporates an array of tunable filters for respectively receiving the reflected light beams. A third semiconductive substrate is bonded to the second chip and has an array of guiding grooves having axes perpendicular to the major surfaces of the third semiconductive substrate for insertion of output light channels, such array matching and being passively aligned with the filter array.

DETAILED DESCRIPTION OF PREFERRED EMBODIMENTS

Figure 1:
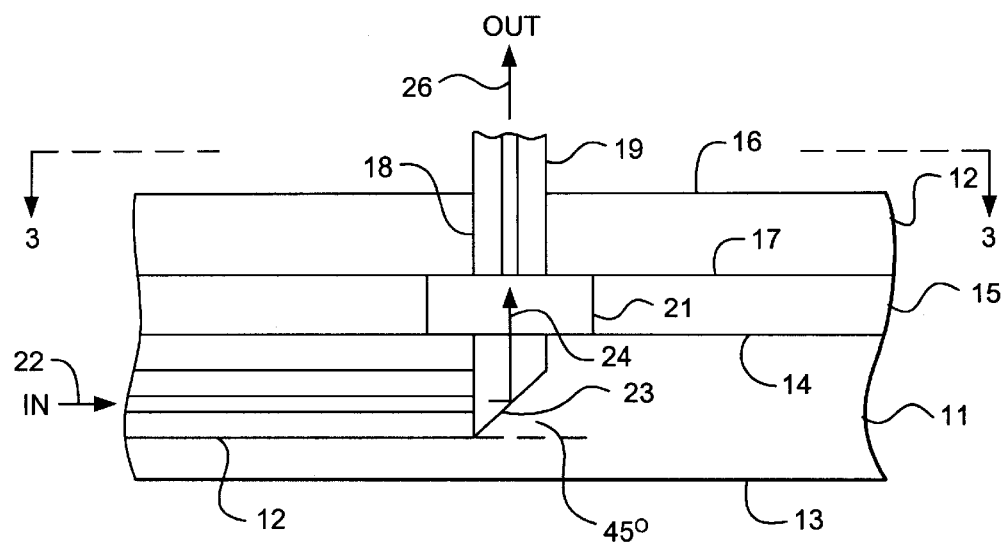
FIG. 1 is a partial cross-sectional view embodying the invention.

FIG. 1 illustrates the optical tunable filter array of the present invention with integrated input-output coupler. This is formed by three semiconductor substrates or wafers. An input coupler includes the wafer 11, with an array of guide channels 12 parallel to the major surfaces 13, 14, and which has inserted in it optical fibers to form fiber optic input channels. Of course, the entire device could be reversed and this could be the output channel of the device depending upon orientation of the tunable filters.

Figure 3:
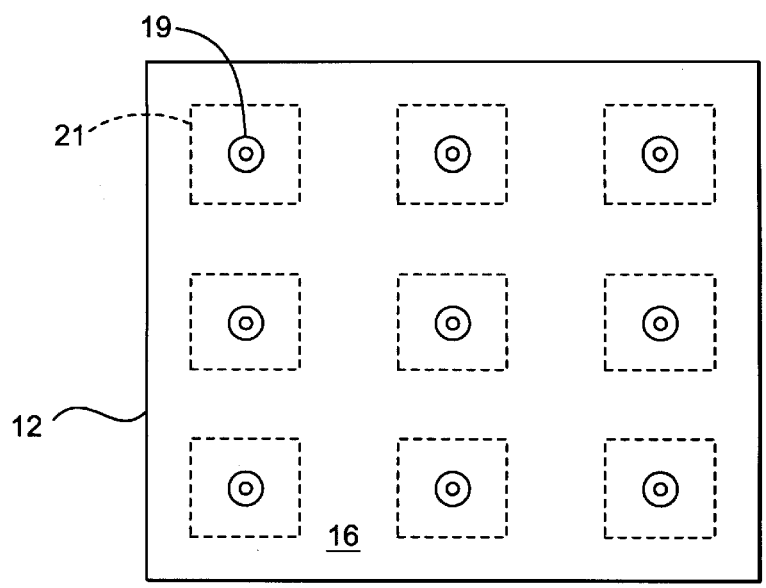
FIG. 3 is a plan view taken along the line 3—3 of FIG. 1.

A second exterior substrate 12 has an array of guiding grooves 18 having axes perpendicular to the major surfaces 16, 17 in which fiber optic output channels 19 may be inserted. Sandwiched between these wafers or substrates 11, 12 is a tunable filter chip 15 having an array of tunable filters 21. Thus, the path of the light beam through a single representative fiber optic channel initiated at 22 which is designated "IN" proceeds to a interior 45° mirrored or reflecting surface 23 in the first semiconductor substrate 11 (which is typically of silicon) and then the reflected beam 24 is received by the tunable filter 21 and after processing continues on the output path 26 through the optical fiber 19. Thus, the beam has been shifted 90° from its initial input, and therefor a two-dimensional filter array has been provided. FIG. 3 is a top view of the complete filter array illustrating the top surface 16 of the third semiconductive substrate 12, the filter arrays 21 and the fiber optic channels 19.

Figure 2:
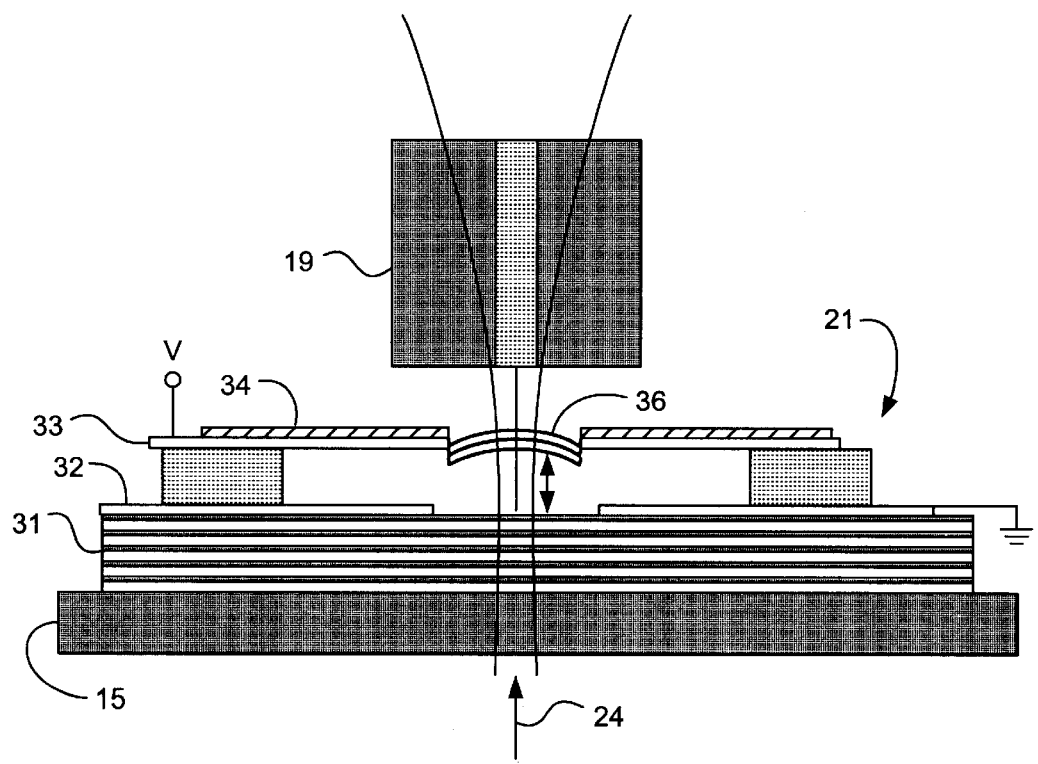
FIG. 2 is an enlarged cross-sectional view of a filter portion of FIG. 1.

The representative tunable filter 21 is fully illustrated as incorporated in the semiconductive chip 15, in FIG. 2. The tunable filter by itself is well known and is fully shown in the article by P. Tayebati, "Microelectromechanical Tunable Filter with Stable Half Symmetrical Cavity" referenced above. The semiconductive chip 15 is shown, which would have appropriate apertures. Arrayed on this chip 15 are eight pairs 31 of quarter wave stacked mirrors which are formed by ion beams sputtered on a silicon substrate. Layer 32 is electrical ground and there is an aluminum layer 33 carrying a nitride layer 34; the aluminum layer defines the top mirror electrode 36.

Figure 4:
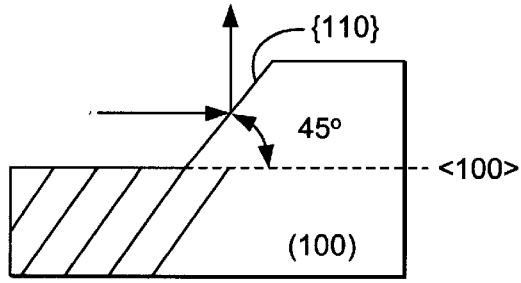
FIG. 4 is a cross-sectional view of one embodiment of a mirror portion of FIG. 1.
Figure 5:
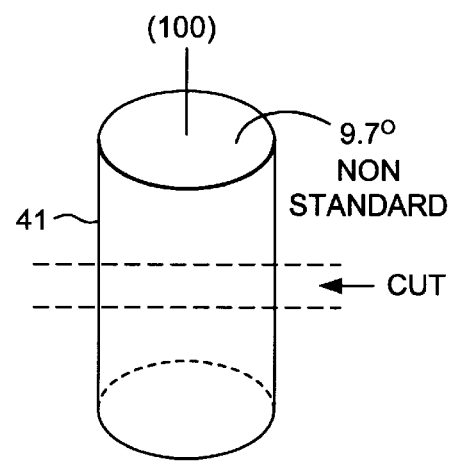
FIG. 5 is perspective view of a semiconductive crystal illustrating another embodiment of the invention.
Figures 6, 7:
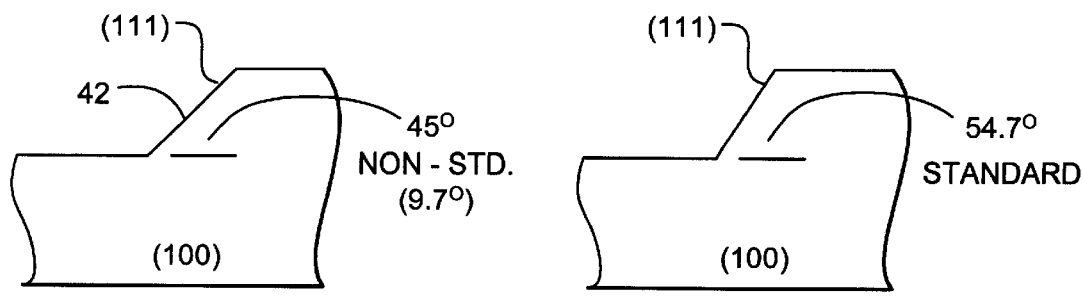
FIG. 6 is a cross-sectional view similar to FIG. 4 illustrating another embodiment of the invention and is related to the crystal of FIG. 5.
FIG. 7 is a cross-sectional view similar to FIG. 6 illustrating a prior art mirror surface.

Referring now to the first semiconductive or silicon substrate 11, the interior array of 45° angle mirrors 23 may be formed in any convenient way, but there are two processes which are deemed suitable. FIG. 4 illustrates one where the mirror is formed by the slow etching in a {110} plane on a standard {100} wafer, as illustrated. This is described more fully in an article by M. Sekimura entitled: "Anisotropic Etching of Surfactant-Added TMAH Solution." Another technique which is illustrated in an article by Daniel J. Sadler, et al. entitled: "Optical Reflectivity of Micromachined {111}-oriented Silicon Mirrors for Optical Input-Output Couplers." On page 264, it suggests the use of a non-standard wafer whose polished surface is 9.7° out of the (100) plane. Thus, this non-standard wafer 41 is shown in FIG. 5. If the non-standard wafer is used and etched, as illustrated in FIG. 6 at 42, a 45° surface in a {111} plane is formed. FIG. 7 illustrates etching on the {111} plane which would normally form with a standard wafer an angle 54.7°. However, it would not be suitable for the present invention.

Thus, in summary, by sandwiching a tunable filter chip between two silicon substrates with passively aligned guiding grooves for optical fibers, a tunable filter with an integrated input-output coupler can be achieved. With this type of integrated design, optical loss due to misalignment between tunable filter and input-output ports is minimized due to the inherent passive alignment. In addition, a two-dimensional tunable filter array with integrated input-output coupler can easily be coupled to a two-dimensional vertical cavity surface emitting lasers (VCSELs). Thus transmitted optical data can readily flow from one optical network to another optical network. The three substrates or wafers, i.e., the tunable filter wafer and the other two silicon wafers, can be fabricated separately and then bonded together by a low temperature bonding technique such as thermosonic bonding or reactive metal bonding, or by some specifically designed structure in each substrate to avoid temperature effects on the performance of the tunable filter chip.

What is claimed is:

1. An integrated two-dimensional tunable filter array for a matrix of fiber optic input/output light channels incorporating microelectromechanical (MEMS) tunable filters comprising:
   - a first semiconductor substrate having a plurality of guiding grooves for said input light channels aligned in a predetermined plane parallel to the major surfaces of said substrate extending from an external portion of said substrate and terminating in an interior array in said substrate in 45° reflecting surfaces to cause light beams of inserted said light channels in said guiding grooves to be reflected 90° from said plane;
   - a second semiconductive chip bonded to said first substrate and incorporating an array of said tunable filters for respectively receiving said reflected light beams;
   - a third semiconductive substrate bonded to said second chip and having an array of guiding grooves having axes perpendicular to said major surfaces of said third semiconductive substrate for insertion of output light channels, such array matching and being passively aligned with said filter array.

2. An integrated two-dimensional tunable filter array for a matrix of fiber optic input/output light channels incorporating microelectromechanical (MEMS) tunable filters as in claim 1 where said 45° reflecting surface is formed by slow etching a {110} plane mirror on a standard {100} silicon semiconductive substrate.

3. An integrated two-dimensional tunable filter array for a matrix of fiber optic input/output light channels incorporating microelectromechanical (MEMS) tunable filters as in claim 1 where said 45° reflecting surface is a {111} plane and is formed by using a non-standard 9.7° off axis cut of a {100} semiconductive substrate.

* * * * *